United States Patent
Barrera et al.

(10) Patent No.: US 6,689,708 B2
(45) Date of Patent: Feb. 10, 2004

(54) PREPARATION PROCEDURE FOR A ZEOLITE TYPE MONOMETALLIC CATALYST TO OBTAIN HIGH OCTANE GASOLINES THROUGH NAPHTHA REFORMING PROCESS

(75) Inventors: Jesus Manuel Bautista Barrera, Mexico City (MX); Ma. de Lourdes Ramirez de Lara, Mexico City (MX); Rene Zarate Ramos, Mexico City (MX); Oscar H. Bermudez Mendizabal, Ciudad Satelite (MX); Gabriela Espinosa Santamaria, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 0 days.

(21) Appl. No.: 09/961,398

(22) Filed: Sep. 25, 2001

(65) Prior Publication Data

US 2003/0040426 A1 Feb. 27, 2003

(30) Foreign Application Priority Data

Sep. 26, 2000 (MX) .............................. 0009407

(51) Int. Cl.$^7$ ............................... B01J 29/06
(52) U.S. Cl. ............................... 502/64; 502/66
(58) Field of Search .............................. 502/64, 74, 66

(56) References Cited

U.S. PATENT DOCUMENTS

| | | | | |
|---|---|---|---|---|
| 3,557,024 A | * | 1/1971 | Young et al. .................. | 502/66 |
| 4,448,891 A | * | 5/1984 | Cohen ......................... | 502/74 |
| 4,552,856 A | * | 11/1985 | Tauster et al. ................. | 502/74 |
| 4,568,655 A | * | 2/1986 | Oleck et al. ................... | 502/66 |
| 4,595,668 A | * | 6/1986 | Poeppelmeier et al. ........ | 502/66 |
| 4,652,360 A | * | 3/1987 | Dessau ......................... | 208/138 |
| 4,849,567 A | * | 7/1989 | Dessau et al. ................. | 585/379 |
| 4,868,145 A | * | 9/1989 | Dessau et al. ................. | 502/66 |
| 4,987,109 A | * | 1/1991 | Kao et al. ..................... | 502/66 |
| 4,992,158 A | | 2/1991 | Schweizer .................... | 208/65 |
| 5,011,805 A | * | 4/1991 | Dessau ......................... | 502/66 |
| 5,052,561 A | * | 10/1991 | Miller et al. .................. | 208/137 |
| 5,066,628 A | * | 11/1991 | Miller et al. .................. | 502/66 |
| 5,108,969 A | * | 4/1992 | Del Rossi et al. ............. | 502/66 |
| 5,155,075 A | * | 10/1992 | Innes et al. ................... | 502/52 |
| 5,194,244 A | * | 3/1993 | Brownscombe et al. ..... | 423/700 |
| 5,382,353 A | * | 1/1995 | Mulaskey et al. ............ | 208/138 |
| 5,620,937 A | * | 4/1997 | Mulaskey et al. ............ | 502/66 |
| 5,665,223 A | * | 9/1997 | Bogdan ........................ | 208/138 |
| 5,807,799 A | * | 9/1998 | Drake et al. .................. | 502/67 |
| 5,905,051 A | * | 5/1999 | Wu et al. ...................... | 502/60 |
| 6,063,723 A | * | 5/2000 | Miller .......................... | 502/66 |
| 6,200,464 B1 | * | 3/2001 | van Houtert et al. ........ | 208/119 |
| 6,444,610 B1 | * | 9/2002 | Yamamoto ................... | 502/325 |
| 2002/0198098 A1 | * | 12/2002 | Yamamoto et al. ........... | 502/63 |

* cited by examiner

Primary Examiner—M. Alexandra Elve
Assistant Examiner—Colleen P. Cooke
(74) Attorney, Agent, or Firm—Roylance, Abrams, Berdo & Goodman, L.L.P.

(57) ABSTRACT

A process for preparing a reforming catalyst comprises incorporating a group IA alkali metal from an aqueous alkaline solution into a zeolitic material by means of ion exchange to form an alkali metal-modified zeolitic support material, which is dried, calcined and combined with an inorganic oxide. The combination is dried and calcined to form a stable inorganic oxide/zeolitic catalyst support which is impregnated with a Group VIII metal by ionic exchange to form an impregnated inorganic oxide/zeolitic catalyst support which is dried, calcined and reduced from a naphtha reforming catalyst.

27 Claims, No Drawings

PREPARATION PROCEDURE FOR A ZEOLITE TYPE MONOMETALLIC CATALYST TO OBTAIN HIGH OCTANE GASOLINES THROUGH NAPHTHA REFORMING PROCESS

FIELD OF THE INVENTION

The present invention relates to a process for the preparation of a zeolitic type catalyst with high stability in its physical, chemical and catalytic properties to obtain high octane gasoline by the conversion of paraffinic and naphthenic hydrocarbons present in the feed to a naphtha reforming process.

More particularly, this invention relates to a procedure for the preparation of a monometallic platinum catalyst on an inorganic oxide/zeolite support, preferably beta zeolite, used to convert paraffinic and naphthenic hydrocarbons which are present in the naphtha reforming process.

BACKGROUND OF THE INVENTION

There exists a great variety of naphtha reforming catalyst which comprise a support to which metals from Group VIII are integrated by simultaneous or stagewise impregnation methods or by using incipient wetness techniques. The support may be a synthetic or natural inorganic oxide or a combination of both, such as alumina, alumina-silicate, magnesium oxide, bentonite, diatomaceous earth, silica, crystalline zeolites, and others. However, reforming processes are generally carried out in the presence of low cracking catalysts which limits the acidity range. Therefore, the most common supports used for the preparation of these catalyst are alumina, especially high purity alumina (gamma or eta alumina), magnesia, crystalline aluminosilicates (zeolites) with controlled acidity, or a combination thereof.

Metals from Group VIII (8, 9 and 10) which have been used are cobalt, nickel, ruthenium, rhodium, palladium, osmium, indium and/or platinum. Metals from Group IA which have been used are lithium, sodium, potassium, rubidium, cesium and/or francium.

U.S. Pat. No. 4,987,109, which patent is incorporated by reference in its entirety, discloses a procedure for the preparation of a high activity, selectivity and stability catalyst, using L type zeolite to which washings are performed using an aqueous potassium solution, with a 9.4 to 10 pH and integrating platinum to the support, using tetraamino platinum chloride as a platinum source.

U.S. Pat. No. 4,992,158, which patent is incorporated by reference in its entirety, discloses a procedure to prepare a catalyst for a reforming process. Such catalyst contains a noble metal in a faujasite or L type zeolite. Catalysts are prepared by treating zeolites with platinum or palladium acetilacetonate or both, or platinum sources such as tetraamino platinum chloride or chloral platinic acid in aqueous solution at 1 wt % concentrations.

U.S. Pat. No. 5,066,628, which patent is incorporated by reference in its entirety, discloses a procedure to obtain a bimetallic catalyst for a reforming process containing an L zeolite on which the cationic sites have been exchanged with potassium or barium or both and containing a noble metal and rhenium. This catalyst brings high selectivity to aromatics formation. The catalyst has a platinum/rhenium weight ratio between 0.01:1.0 to 10:0, which platinum is integrated to zeolite (BaKL) by incipient wetness impregnation with nitrate tetraamino platinum aqueous solution, and rhenium is integrated by incipient wetting with ammonium pherrenate aqueous solution.

SUMMARY OF THE INVENTION

The present invention involves a catalyst preparation technique which is relatively simple and provides a naphtha reforming catalyst having a high activity and stability in naphtha reforming including reactions of dehydrogenation, dehydrocyclization and naphthene and paraffinic isomerization, which results in high octane gasoline.

The present process involves a process for preparing a reforming catalyst which comprises incorporating a group IA alkali metal from an aqueous alkaline solution into a zeolitic material by means of ion exchange to form an alkali metal-modified zeolitic support material. The modified zeolitic support material is dried, calcined and combined with an inorganic oxide. The combined material is dried and calcined to form a stable inorganic oxide/zeolitic catalyst support. The inorganic oxide/zeolitic catalyst support is impregnated with a Group VIII metal to form an impregnated inorganic oxide/zeolitic catalyst support. The impregnated inorganic oxide/zeolitic catalyst support is dried, calcined and reduced to provide a naphtha reforming catalyst.

Surprisingly, the catalyst produced by the process of the present invention does not require a continuous chlorine adjustment to maintain the chlorine concentration as required by a commercial catalyst, as hereinafter demonstrated.

More specifically, the process involves the following stages:

1. Preparing the zeolitic material, modifying its intrinsic acidity by means of a neutralizing agent;
2. Drying the modified zeolitic material at a temperature to eliminate moisture, and calcining the dried product at high temperatures;
3. Preparing the support by combining an inorganic oxide and the modified zeolitic material with a chemical treatment, and further support preparation with the alumina and modified zeolite;
4. Drying the alumina and modified zeolite support to eliminate moisture and subsequent calcination at high temperature to generate stable physical and chemical properties in the support;
5. Preparing an impregnation solution with the desired metal in an alkaline media and contacting the solution with the porous support using ion exchange at room temperature to impregnate the support with the metal; and
6. Drying the support impregnated with the metal, calcining the impregnated support in an oxidizing atmosphere and activating the catalyst in a reducing atmosphere.

The resulting catalyst contains an element of Group IA (1) and an element from Group VIII (10) together on a refractory support of inorganic oxides with elements from Group IVA (14) and IIIA (13). To integrate the mentioned metals, an ion exchange method is used to integrate an element from Group IA (1) into the zeolitic material and the resultant zeolitic material is impregnated by incipient wetness or ion exchange (Group VIII (10) metal complexes) to integrate this metal into a cylindrical, spherical or trilob support which is formed with inorganic oxides from Groups IVA (14) and IIIA (13). These oxides are treated for stabilization and activation, giving place to a high activity, selectivity and stability catalyst.

DETAILED DESCRIPTION OF THE INVENTION

The process of the present invention involves various stages as hereinafter described.

An aqueous alkaline solution is formed with an hydroxide, nitrate or chloride, for example, of a Group IA metal, such as sodium, potassium, rubidium, cesium or lithium, with cesium being preferred.

For example, an aqueous solution of cesium hydroxide may be used having a concentration between from about 3 to about 25 wt % cesium based on the weight of zeolite to be exchanged, maintaining pH values between about 7.5 and about 12, preferably between about 8.5 and about 11. Cesium will be hereinafter specifically referred to for illustrative purposes.

Any suitable zeolite may be used in the process of the present invention, including a beta type crystalline zeolite, an L type zeolite, a pentasil ZSM-5 type zeolite, and a faujasite Y type zeolite with a high $SiO_2/Al_2O_3$ ratio, namely, a mole ratio of at least about 50, preferably between about 50 to about 90 mol/mol, or mixtures of such zeolites. The aforesaid zeolites are well known and are used in the process of the present invention without pretreatment. The beta type zeolite is preferred, and will be hereinafter referred to for illustrative purposes.

The cesium metal in solution is integrated into the zeolitic material by ion exchange maintaining constant agitation to enable intimate contact between the beta crystalline zeolite and the cesium hydroxide solution, for a period between about 30 minutes and about 5 hours, preferably between about one and about two hours.

The mixture is then filtered to eliminate residues from the alkaline solution and the zeolitic material is washed with deionized water to ensure that cesium contained in the zeolite material is the only one to be exchanged during the process.

The washed material is dried to eliminate moisture in the zeolite at a temperature between about 90° and about 180° C., and preferably between about 100° and about 150° C., for a period of from about 30 minutes to about 3 hours, and preferably from about 1 to about 2 hours.

The dried zeolite material is then calcined at a temperature of between about 300° and about 600° C., and preferably between about 450° and about 550° C. to obtain a stable modified zeolitic material.

Meanwhile, an extrudable inorganic oxide paste is prepared by agitating the inorganic oxide with deionized water and an acid. Suitable inorganic oxides include gamma alumina, eta alumina and precursors of such aluminas, including bayerite, bohemite and gibsite; magnesia, titania, or combinations of such inorganic metal oxides, with bohemite being preferred. For example, bohemite, deionized water and nitric acid are mechanically agitated to form a paste and the cesium exchanged zeolite is added and mixed until an extrudable homogenized paste is obtained. In addition to nitric acid, the inorganic oxide paste can be formed using chlorhydric acid, formic acid or acetic acid, for example.

Extrusion of the resulting paste is performed to obtain a cylindrical extrudate, for example, about 1.65 to about 1.80 mm diameter. The resulting support is dried, first at room temperature for a period between about 30 minutes to about 4 hours, and preferably from about 1 hour to about 2 hours, and then dried at moderate temperatures between about 90° and about 180° C., and preferably 100° and about 150° C., for 30 minutes to 3 hours, and preferably from about 1 hour to about 2 hours. Then calcination is preformed at a high temperature of between about 300° and about 600° C., and preferably from about 450° and about 550° C., to obtain an alumina-modified zeolite support with high stability. Any suitable extrudate form may be used, including spherical, cylindrical, trilob or other forms.

The hydrogenating-dehydrogenating metal may be any Group VIII (10) noble metal, such as platinum or palladium, with platinum being preferred. The Group VIII (10) metal is incorporated in the support by an ion exchange technique using, for example, as a platinum source, salts from amino chloride or tetraamino nitrate platinum complex compounds. The impregnating aqueous solution is contacted with the support for a period of from about 24 to about 96 hours, and preferably from about 24 to about 72 hours, at room temperature. Suitable amounts of the Group VIII noble metal should be used to provide from about 0.20 to about 0.50 wt % based on the total catalyst weight. Next, it is decanted and the impregnated solid is washed and dried at a moderate temperature between about 90° and about 180° C., and preferably between about 100° and about 150° C., for a period between about 30 minutes and about 3 hours, and preferably between about 1 hour and about 2 hours. After this drying stage, calcination at high temperature is performed under oxidation conditions at a temperature of between about 200° and about 600° C., and preferably between about 200° and about 500° C., for a period between about 0.5 and about 10 hours, and preferably between about 1 hour and about 6 hours. This calcination is in an oxidizing atmosphere using dry air or a mixture of oxygen-nitrogen. Next, the product is activated in a reducing atmosphere between about 200° and about 650° C., and preferably between about 400° and about 650° C., for a period of between about 0.5 and about 8 hours, and preferably between about 2 hours and about 6 hours.

A preferred catalyst contains from about 0.5 to about 2 wt % cesium based on the wt. % catalyst base.

The aforesaid preparation procedure was performed at atmospheric pressure, but can be conducted at higher or lower pressures.

Raw materials that can be used in the previous procedure are chlorine-platinum acid, or nitrate, or tetraamino platinum chloride as platinum sources; as alkaline metal sources, cesium nitrate, cesium chloride or cesium hydroxide can be used; beta type crystalline zeolites, as well as L type, pentasil ZSM-5-type and faujasite Y type zeolites: crystalline phase alumina, gamma or eta, precursors of these (bayerite, bohemite or gibsite), magnesia, titania, or combinations of them, as supports, in extrudate form (cylindrical, trilob or other forms) and spherical.

The catalyst obtained by this procedure has high activity, selectivity and stability for dehydrogenation, dehydrocyclization and naphtha isomerization to obtain high octane gasoline.

The resulting catalyst of this invention produces high hydrocarbon conversion to products of increased commercial value (high octane gasoline, fuel gas, $C_1$–$C_2$ LPG, $C_3$–$C_4$ hydrocarbons and hydrogen). Additionally, when the present catalyst is used to obtain high octane gasoline in a naphtha reforming process, it can easily be regenerated using conventional controlled combustion techniques. For example, carbon deposits can be removed from the present catalyst using an oxygen-containing gas at a pressure between 3 to 10 kg/cm² and a temperature between 300° to 420° C. for a period between 10 to 25 hours, and subsequently incrementing the temperature between 430° to 500° C. for a period of 5 to 15 hours.

The invention will be further illustrated by the following examples. It should be understood that they are not intended to limit the scope of this invention. All percentages are by weight unless otherwise noted.

EXAMPLE 1

Using 10 grams of beta type zeolite, in its acid form, with a specific area of 789 m$^2$ and pore volume of 1.17 cm$^3$/g, a catalyst was prepared using the following procedure:

A cesium hydroxide aqueous solution was prepared having a final pH above 9.0, containing 0.6316 grams of cesium hydroxide monohydrate, in 25 ml of deionized water. The solution is added to the zeolitic material while continuously agitating to allow ion exchange. Cesium ions exchange with zeolite acid sites. Agitation is maintained for 1 hour to 2 hours at room temperature. The resulting material was dried at a moderate temperature of between 90° and 150° C. using hot air flow for a period of 1–3 hours. The catalyst is then calcined at a temperature of between 400–600° C. An extrudate is prepared by forming an alumina paste from bohemite and the modified zeolite. To perform this, bohemite is exposed to a chemical treatment. Calculated bohemite (12% excess in relation to required alumina; 89.1 wt % alumina in the final product), is chemically treated with nitric acid solution with 10% volume concentration, using a 15% of acid with respect to the calculated bohemite quantity. The deionized water is 50% with respect to the bohemite quantity used.

Within a vessel, 80% of the water is put in contact with the bohemite, adding slowly to the water, and continuously agitating using a mechanical agitator. Next, the calculated acid quantity is added while constantly agitating. At the same time, modified zeolite was dissolved in the same quantity of water (a 20% excess is allowed) which is incorporated into the alumina paste and is homogenized by a constant agitation. The zeolite in the vessel is washed with the remaining 20% deionized water. The zeolite and water are mixed until a handling paste is obtained (5–20 minutes). Next, extrusion of the paste is performed with extruding equipment to form cylindrical extrudates having a diameter of 1.65 to 1.80 mm.

The dried extrudate is then separated to obtain cylindrical particles with a length between 4.5 to 8.5 mm. The particles are dried at moderate temperature between 100°–150° C. for a period of 1–2 hours. Next, the solid is calcined at a temperature between 200° and 500° C. for a period of between 1–6 hours. The calcined material is impregnated with an aqueous solution containing 0.7938 tetraamino platinum nitrate solution which is contacted with the support for 72 to 90 hours at room temperature. After this period, the remaining liquid is decanted, followed by drying of the material at a temperature between 100°–150° C. for a period of 1 to 2 hours. After this, the resulting solid material is calcined at a temperature between 200° and 500° C. for a period of between 1 to 6 hours, under an oxidizing atmosphere.

The resultant product was activated under a reducing atmosphere containing pure hydrogen in a pilot plant unit, at a temperature between 400°–500° C. for 2 to 6 hours.

In this way, a catalyst (I) was obtained with the metals in an elemental stage in a high percentage and final concentration of 0.40 wt % Pt, 0.5 wt % Cs both based on the weight of the catalyst support, having a surface area of 241 m$^2$/g and pore volume of 0.5 cc/g.

EXAMPLE 2

Using the preparation methodology described in Example 1, a modified zeolite catalyst batch was prepared, with only platinum integration technique, using incipient wetness impregnation to obtain catalyst (II) with similar characteristics as described in Example 1. Composition of this batch was 0.40 wt % platinum and 0.5 wt % cesium, based on the weight of the catalyst support, with a 230 m$^2$/g surface area and a pore volume of 0.48 cc/g.

The oxidation reduction methodology used to prepare the catalyst was the same as that used for the catalyst in Example 1.

EXAMPLE 3

To evaluate catalytic properties for Catalysts I and II, these were evaluated at pilot plant level using a fixed bed reactor. On this plant, a naphthenic stream was put in contact with an hydrogen stream in the presence of the catalyst at typical naphtha reforming process operating conditions, using fresh catalyst to obtain high octane gasoline.

Table 1 shows a summary of the principal characteristics of the obtained catalysts by the previously described procedures. Tables 2, 3 and 4 show the operating conditions and feed characteristics used to obtain high octane gasoline. Also, pilot plant evaluation results for Catalysts I and II are shown. These results are compared with results from a commercial reference catalyst. It is significant to note that during pilot plant evaluations with the reference commercial catalyst, continuous chlorine adjustment was required to maintain the same initial chlorine concentration on the catalyst during the test, but not with Catalysts I and II.

TABLE 1

PRINCIPAL CHARACTERISTICS EVALUATED SAMPLES

| Catalyst | I | II | Commercial |
|---|---|---|---|
| Support | Zeolite β/γ Al$_2$O$_3$ | Zeolite β/γ Al$_2$O$_3$ | γ Al$_2$O$_3$ |
| Surface Area, m$^2$/g | 241 | 230 | 200 |
| Pore Volume, cc/g | 0.5 | 0.48 | 0.55 |
| Density, g/cc | 0.5 | 0.5 | 0.7 |
| Pt, wt % | 0.4 | 0.40 | 0.28 |
| Re, wt % | — | — | 0.28 |
| Cesium, wt % | 0.5 | 0.5 | — |
| Cl, wt % | — | — | 0.92 |

Without limiting the present invention to a particular theory, it is believed that when using conventional catalysts, the Bronsted acidity necessary to perform naphtha reforming reactions is generated by chlorine ions in combination with hydroxyl groups from the active alumina (e.g., gamma). The chlorine has the property of migrating from hydroxyl to hydroxyl until it finally leaves the catalytic system. This necessitates a constant chlorine addition in order to maintain the required acidity level. By contrast, when using the catalyst of the present invention, acidity is provided by the zeolitic material, resulting in a stable acidity depending only on the material crystalline structure, and not requiring any chlorine addition for operation.

TABLE 2

FEED PRINCIPAL CHARACTERISTICS. PILOT PLANT EVALUATIONS

| Feed | Desulfurized Naphtha |
|---|---|
| Initial Boiling Temperature, ° C. | 89.6 |
| Final Boiling Temperature, ° C. | 194.5 |
| PIONA, Analysis, wt % | — |
| Paraffins | 26.73 |
| Iso paraffins | 27.12 |
| Olefins | 0.40 |
| Naphthenes | 19.28 |
| Aromatics | 22.20 |
| Octane Number | 56 |

TABLE 3

OPERATING CONDITIONS USED FOR CATALYSTS EVALUATION AT PILOT PLANT LEVEL

| Operating Conditions | |
|---|---|
| Pressure, Kg/cm$^2$ | 13.5 |
| Temperature, ° C. | 450–520 |
| Space Velocity, h-1 | 1.6 |
| Molar Ratio, H$_2$/HC | 6.5 |
| Iso paraffins | 27.12 |

TABLE 4

PILOT PLANT EVALUATIONS RESULTS TO OBTAIN HIGH OCTANE GASOLINE USING CATALYSTS 1, II AND COMMERCIAL CATALYST ACTIVITY AND SELECTIVITY TEST WITH TEMPERATURE VARIATION

| Temperature, ° C. | RON | YIELD, C5+, wt % | PROD, H2, wt % | R—O |
|---|---|---|---|---|
| Fresh Catalyst | | | | |
| Catalyst I | | | | |
| 450 | 96.7 | 84.11 | 0.62 | 81.33 |
| 460 | 98.1 | 83.68 | 0.69 | 82.09 |
| 470 | 98.6 | 83.23 | 0.81 | 82.06 |
| 480 | 99.2 | 82.93 | 0.98 | 82.27 |
| 490 | 100 | 82.42 | 1.04 | 82.42 |
| 500 | 100.8 | 81.70 | 1.16 | 82.44 |
| 510 | 101.9 | 81.32 | 1.29 | 82.87 |
| 520 | 102.6 | 80.58 | 1.36 | 82.68 |
| Catalyst II | | | | |
| 450 | 95.8 | 84.45 | 0.63 | 81.28 |
| 460 | 96.8 | 83.85 | 0.67 | 81.17 |
| 470 | 97.9 | 83.54 | 0.79 | 81.79 |
| 480 | 98.5 | 83.09 | 0.98 | 81.84 |
| 490 | 99.4 | 82.57 | 1.07 | 82.07 |
| 500 | 100.1 | 81.88 | 1.20 | 81.96 |
| 510 | 101.1 | 81.25 | 1.31 | 82.14 |
| 520 | 102.0 | 80.39 | 1.38 | 81.99 |
| Commercial Catalyst | | | | |
| 450 | 87 | 91.5 | 1.70 | 79.61 |
| 470 | 89 | 90 | 1.80 | 80.10 |
| 490 | 93.4 | 87.2 | 1.96 | 81.44 |
| 510 | 97.1 | 83.9 | 2.23 | 81.47 |
| 520 | 98 | 81 | 2.29 | 79.38 |

EXAMPLE 4

In order to confirm the stability of physical, chemical and catalytic properties for Catalyst I, a regeneration process was performed after the pilot plant evaluation, as described in Example 3. Spent catalysts (Catalyst I and Commercial) were treated to eliminate carbon and in the commercial catalyst case, the chlorine content was adjusted to the initial value. The regenerated catalysts were evaluated to determine activity and selectivity in a similar way as performed in Example 3, but using the regenerated catalysts. The results obtained from this test are reported in Table 5.

It is noted that pilot plant evaluations with the reference commercial catalyst required a continuous chlorine adjustment to maintain the initial concentration on the catalyst through the test.

TABLE 5

PILOT PLANT EVALUATIONS RESULTS IN OBTAINING HIGH OCTANE GASOLINES WITH REGENERATED CATALYST I AND COMMERCIAL SAMPLES FOR ACTIVITY AND SELECTIVITY TESTS WITH TEMPERATURE VARIATION

| Temperature, ° C. | RON | YIELD, C5+, wt % | PROD, H2, wt % | R—O |
|---|---|---|---|---|
| Regenerated Catalysts | | | | |
| Regenerated Catalyst I | | | | |
| 450 | 95.9 | 84.32 | 0.61 | 80.86 |
| 460 | 97.4 | 83.86 | 0.67 | 81.68 |
| 470 | 98.0 | 83.39 | 0.78 | 81.72 |
| 480 | 98.5 | 83.07 | 0.96 | 81.82 |
| 490 | 99.4 | 82.62 | 1.03 | 82.12 |
| 500 | 100.1 | 81.94 | 1.14 | 82.02 |
| 510 | 101.3 | 81.56 | 1.30 | 82.62 |
| 520 | 101.8 | 80.73 | 1.35 | 82.18 |
| Commercial Regenerated Catalyst | | | | |
| 490 | 93.0 | 85.43 | 1.85 | 79.45 |
| 500 | 94.5 | 84.20 | 2.08 | 79.57 |
| 510 | 97.0 | 82.00 | 2.20 | 79.54 |
| 520 | 98.4 | 81.49 | 2.30 | 80.19 |

EXAMPLE 5

In order to confirm catalytic stability for Catalyst I, a catalytic stability test was performed at constant temperature, in which Catalyst I was evaluated maintaining a 460° C. constant temperature while the rest of the operating conditions were kept similar to those used in Examples 3 and 4 of the present invention. The reference commercial catalyst was evaluated at similar conditions, but keeping a 510° C. constant temperature. Results obtained from the evaluations are shown on Table 6.

Pilot Plant evaluations with the reference commercial catalyst required a continuous chlorine adjustment to keep the initial concentration level on catalyst throughout the test.

TABLE 6

PILOT PLANT EVALUATION RESULTS IN OBTAINING HIGH OCTANE GASOLINES WITH CATALYST I AND COMMERCIAL CATALYST FOR CATALYTIC STABILITY TEST AT CONSTANT TEMPERATURE

| | Fresh Catalysts | | | | | |
|---|---|---|---|---|---|---|
| | Commercial (510° C.) | | | Catalyst I (460° C.) | | |
| Time, hrs | RON | C5, wt % | R—O | RON | C5+, wt % | R—O |
| 8 | 99.1 | 79.5 | 78.78 | 98.3 | 82.64 | 81.24 |
| 24 | 98.1 | 80.8 | 79.26 | 98.4 | 82.6 | 81.28 |
| 40 | 97.0 | 81.1 | 78.66 | 98.3 | 82.48 | 81.08 |
| 56 | 96.6 | 81.5 | 78.82 | 98.2 | 82.52 | 81.03 |
| 72 | 95.8 | 80.7 | 78.25 | 98.1 | 82.6 | 81.03 |
| 88 | 96.4 | 81.9 | 78.95 | 98.1 | 82.74 | 81.17 |

TABLE 6-continued

PILOT PLANT EVALUATION RESULTS IN OBTAINING
HIGH OCTANE GASOLINES WITH CATALYST I AND
COMMERCIAL CATALYST FOR CATALYTIC STABILITY
TEST AT CONSTANT TEMPERATURE

| | Fresh Catalysts | | | | | |
|---|---|---|---|---|---|---|
| | Commercial (510° C.) | | | Catalyst I (460° C.) | | |
| Time, hrs | RON | C5, wt % | R—O | RON | C5+, wt % | R—O |
| 104 | 95.0 | 81.7 | 78.61 | 97.8 | 82.98 | 81.15 |
| 120 | 94.8 | 82.8 | 78.49 | 96.9 | 82.34 | 79.79 |
| 136 | 94.2 | 81.6 | 78.77 | 96.3 | 83.61 | 80.52 |

EXAMPLE 6

In order to evaluate catalyst performance for the present invention, a study on response capability was performed on Catalyst II, evaluating at LHSV values higher than conventional values for a reforming process, keeping a 450° C. constant temperature. The objective was to view the high potential benefits in using this type of catalyst in the reforming process as well as its flexibility in handling feed without significant loss in activity and selectivity. In parallel, the reference commercial catalyst was evaluated under similar operating conditions but maintaining a conventional 1.6 h$^{-1}$ LHSV value. Pilot plant evaluations with the reference catalyst required a continuous chlorine adjustment to keep initial concentration levels on the catalyst throughout the test.

TABLE 7

EVALUATION RESULTS AT PILOT PLANT LEVEL
TO OBTAIN HIGH OCTANE GASOLINE WITH CATALYST I
AND COMMERCIAL CATALYST. ACTIVITY AND
SELECTIVITY TEST WITH LHSV VARIATION.

| Temp, ° C. | RON | C5+ wt % | H2, wt % | R—O | LHSV h-1 |
|---|---|---|---|---|---|
| | Fresh Catalysts | | | | |
| | Catalyst I | | | | |
| 450 | 97.5 | 80.3 | 0.63 | 78.29 | 3.0 |
| 450 | 97.4 | 81.4 | 0.72 | 79.28 | 3.5 |
| 450 | 97.1 | 81.6 | 0.77 | 79.23 | 4.0 |
| | Commercial Catalyst | | | | |
| 450 | 87 | 91.5 | 1.70 | 79.61 | 1.6 |

While several embodiments have been shown to illustrate the invention, it will be understood by those skilled in the art that various modifications and changes can be made therein without departing from the scope of the invention as defined in the following claims.

What is claimed is:

1. A process for preparing a reforming catalyst which comprises
    incorporating a group IA alkali metal from an aqueous alkaline solution into a zeolitic material in its acid form by means of ion exchange to form an alkali metal-modified zeolitic support material,
    drying and calcining said modified zeolitic support material, and combining said modified zeolitic support material with an inorganic oxide and drying and calcining the combined material to form a stable inorganic oxide/zeolitic catalyst support; and
    impregnating said inorganic oxide/zeolitic catalyst support with a Group VIII metal to form an impregnated inorganic oxide/zeolitic catalyst, drying, calcining and reducing said impregnated inorganic oxide/zeolitic catalyst to provide a naphtha reforming catalyst for a naphtha reforming process which does not require adding or adjusting the chlorine content of said naphtha reforming process and which said naphtha reforming catalyst can be regenerated.

2. The process of claim 1, wherein said zeolitic material is beta zeolite, pentasil ZSM-5 zeolite or faujasite Y zeolite.

3. The process of claim 2, wherein said zeolitic material is beta zeolite with a $SiO_2/Al_2O_3$ molar ratio from 50 to about 90.

4. The process of claim 1, wherein the Group IA alkali metal is cesium, and wherein said cesium is from 0.5 to about 2.0 wt % based on the wt % catalyst base and wherein said aqueous alkaline solution of cesium is formed with cesium hydroxide, cesium chloride or cesium nitrate to form cesium modified zeolitic material.

5. The process of claim 1, wherein said group IA alkali metal is cesium and said cesium incorporation into the zeolitic material by means of ionic exchange is conducted at room temperature for a period between about 1 and about 2 hours, then filtered to eliminate residues of the alkaline solution and washed with deionized water to ensure the cesium contained in the zeolite material is the only one to be exchanged during the process, then dried to eliminate moisture at a temperature from about 100° C. to about 150° C. for a period of about 1 hour to about 2 hours and calcined at a temperature from about 450° C. to about 550° C. to obtain a stable modified zeolitic material.

6. The process of claim 1, wherein said inorganic oxide is magnesia, titania, mixtures of magnesia with titania, gamma alumina, eta alumina, or an alumina precursor selected from the group consisting of bayerite, bohemite and gibsite.

7. The process of claim 6, wherein said precursor of said inorganic oxide is high purity alumina in its bohemite form.

8. The process of claim 7, wherein said group IA alkali metal is cesium and said bohemite is treated with acid and mixed with the cesium-modified zeolitic material to form an extrudate.

9. The process of claim 8, wherein said acid treatment applied to bohemite is performed with a dilute nitric acid solution having a nitric acid concentration of from about 5 to about 10 wt %.

10. The process of claim 6, wherein said inorganic oxide is an alumina and is mechanically agitated with deionized water and nitric acid to form a paste then cesium exchanged zeolite is added and mixed to obtain an extrudate paste, said paste being extruded to obtain a cylindrical extrudate from about 1.65 to about 1.80 mm diameter to form an alumina-modified zeolite support.

11. The process of claim 6, wherein drying and calcination of said alumina-modified zeolite support results in a gamma alumina support and beta zeolite.

12. The process of claim 1, wherein said Group VIII (10) metal is platinum at a concentration of from about 0.2 to about 0.5 weight percent based on total catalyst weight.

13. The process of claim 12, wherein said platinum is impregnated using a salt from a platinum amino complex selected from the group consisting of tetraamino platinum chloride and tetraamino platinum nitrate.

14. The process of claim 13, wherein said platinum is integrated into a gamma alumina-modified zeolite support by means of an ionic exchange at room temperature.

15. The process of claim 14, wherein said ionic exchange is performed using an aqueous platinum solution which is maintained in contact with the alumina-modified zeolite support for a period of from about 24 to about 72 hours.

16. The process of claim 1, wherein calcination of said impregnated catalyst support is performed in an oxidizing atmosphere to which a dry air stream or nitrogen/oxygen mixture is used.

17. The process of claim 1, wherein said calcination of said impregnated catalyst support is performed at a temperature between about 200° C. and about 500° C. for a period of between from about 1 hour to about 6 hours under an oxidizing atmosphere.

18. The process of claim 1, wherein said reduction of said impregnated catalyst support is conducted in a reducing atmosphere at a temperature of between about 400° to about 650° C. for a period of between about 2 hours to about 6 hours.

19. The process of claim 1, wherein use of said highly stable naphtha reforming catalyst in a naphtha reforming process does not require adjusting the chlorine content in situ during operation.

20. The process of claim 1, wherein said catalyst when needed in a naphtha reforming process is capable of being regenerated by controlled carbon combustion performed at a pressure of 3 kg/cm$^2$ to 10 kg/cm$^2$ while maintaining the temperature at 300° to 420° C. for a period of from 10 to 25 hours and subsequently maintaining the temperature from 430° to 500° C. for a period of from about 5 hours to about 15 hours.

21. The process of claim 4, wherein said aqueous alkaline solution is cesium hydroxide.

22. The process of claim 1, wherein said group IA alkali metal is cesium and said aqueous alkaline solution comprises cesium hydroxide.

23. The process of claim 22, wherein a pH of between about 7.5 and about 12 is maintained during said ion exchange.

24. The process of claim 23, wherein a pH of between about 8.5 and about 11 is maintained during said ion exchange.

25. A process for preparing a reforming catalyst which comprises incorporating cesium metal from an aqueous alkaline solution into a zeolitic material in its acid form by means of ion exchange, filtering the resulting zeolitic material and washing said filtered zeolitic material with deionized water to form a cesium-modified zeolitic support material, drying and calcining said cesium-modified zeolitic support material, and combining said cesium-modified zeolitic support material with alumina and drying and calcining the combined material to form a stable alumina/zeolitic catalyst support; and impregnating said alumina/zeolitic catalyst support with a Group VIII noble metal to form an impregnated alumina/zeolitic catalyst, drying, calcining and reducing said impregnated alumina/zeolitic catalyst to provide a naphtha reforming catalyst.

26. The process of claim 25, wherein said aqueous alkaline solution of cesium comprises cesium hydroxide.

27. The process of claim 26 wherein a pH of between about 8.5 and about 11 is maintained during said ion exchange.

* * * * *